United States Patent [19]

Uda

[11] Patent Number: 5,212,378
[45] Date of Patent: May 18, 1993

[54] OPTICAL RECEIVER WITH CRITICAL DAMPING RESISTOR

[75] Inventor: Yoshihiro Uda, Tokyo, Japan

[73] Assignee: NEC Corporation, Tokyo, Japan

[21] Appl. No.: 790,189

[22] Filed: Nov. 8, 1991

[30] Foreign Application Priority Data

Nov. 15, 1990 [JP] Japan .................................. 2-307004

[51] Int. Cl.$^5$ ............................................. H01J 40/14
[52] U.S. Cl. .................................. 250/214 R; 359/189
[58] Field of Search ........ 250/214 R, 214 A, 214 RC; 307/311; 359/189, 190, 191, 194, 195

[56] References Cited

U.S. PATENT DOCUMENTS

| | | |
|---|---|---|
| 3,593,038 | 7/1971 | Hylten-Cavallius ............ 250/214 R |
| 3,805,065 | 4/1974 | Williams .............................. 250/226 |
| 5,029,240 | 7/1991 | de La Chapelle et al. ......... 455/619 |

FOREIGN PATENT DOCUMENTS 2527027 11/1983 France .
62-290349 12/1987 Japan .
2222734 3/1990 United Kingdom .

Primary Examiner—David C. Nelms
Attorney, Agent, or Firm—Foley & Lardner

[57] ABSTRACT

An optical receiver includes a light-receiving element, a bias circuit, an output circuit, and a damping resistor. The light-receiving element converts an optical signal into an electrical signal. The bias circuit applies a DC bias voltage to the light-receiving element. The output circuit outputs, from an output terminal, a voltage corresponding to an optical current generated by the light-receiving element. The damping resistor is connected between the light-receiving element and the output terminal in the output circuit and has a resistance set to serve as a critical damping condition in combination with a junction capacitance and a lead inductance of the light-receiving element.

4 Claims, 2 Drawing Sheets

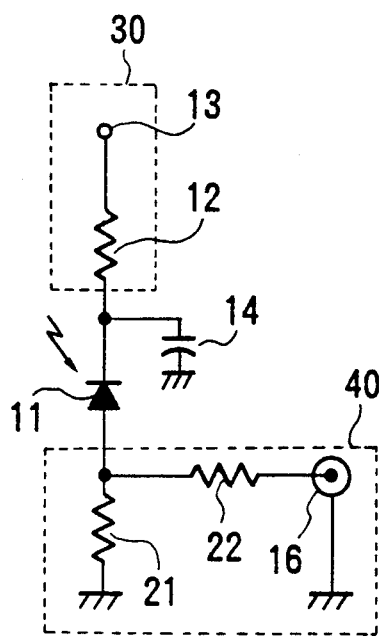
F I G. 1
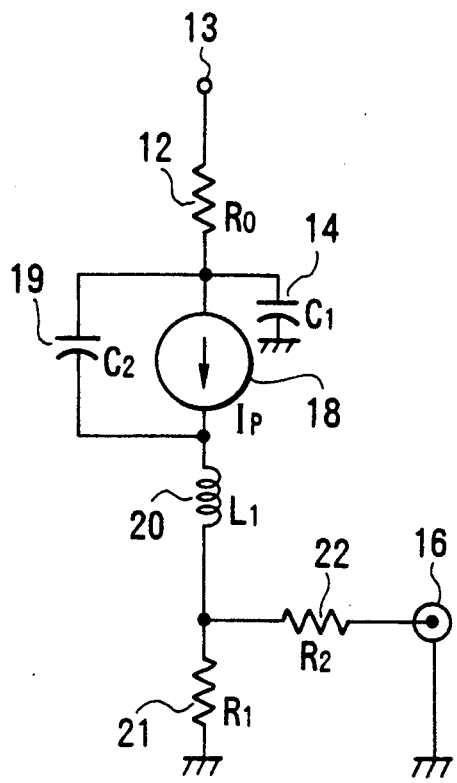
F I G. 2

OPTICAL RECEIVER WITH CRITICAL DAMPING RESISTOR

BACKGROUND OF THE INVENTION

The present invention relates to an optical receiver for converting an optical signal into an electrical signal by means of a light-receiving element and, more particularly, to an optical receiver for optical communication used to convert a high-speed optical signal into an electrical signal and observe the waveform of the signal.

Recently, optical communication systems for transmitting information by using light have been widely used.

FIG. 4 shows an optical receiver for use in conventional optical communication systems. In this optical receiver, a DC bias terminal 13 is connected to the cathode electrode of a photodiode 11 via a resistor 12, and a bypass capacitor 14 is connected between the circuit and ground. The anode electrode of the photodiode 11 is grounded via a resistor 15. The anode electrode is also connected to an output terminal 16 to which a device such as an oscilloscope for waveform measurement is connected through a coaxial cable. In this optical receiver, an input optical signal is converted into a current Ip by the photodiode 11, and a voltage determined by a product of the resistance (normally 50 Ω) of the resistor 15 and the current Ip appears across the two terminals of the resistor 15.

In the above-mentioned conventional optical receiver, the resistance of the resistor 15 is normally set at 50 Ω so as to be matched with the impedance of a circuit or a coaxial cable to be connected to the output terminal 16. However, transient phenomena occur due to the junction capacitance of the photodiode 11 and the inductance of wiring, and this results in ringing in an output pulse waveform. Therefore, it is impossible to perform accurate waveform observation. FIG. 5 graphically illustrates an output waveform as a function of a rectangular-wave input, i.e., a signal voltage waveform at the output terminal 16. This signal voltage waveform produces ringing A in the transient state.

In addition, since the value of the resistor 15 cannot be increased in the conventional optical receiver, the voltage which appears at the output terminal 16 is also low.

SUMMARY OF THE INVENTION

It is, therefore, a principal object of the present invention to provide an optical receiver capable of performing accurate waveform observation by preventing distortion in output waveform.

It is another object of the present invention to provide an optical receiver capable of increasing an output voltage.

In order to achieve the above objects of the present invention, there is provided an optical receiver comprising a light-receiving element for converting an optical signal into an electrical signal, a bias circuit for applying a DC bias voltage to the light-receiving element, an output circuit for outputting, from an output terminal, a voltage corresponding to an optical current generated by the light-receiving element, and a damping resistor connected between the light-receiving element and the output terminal in the output circuit and having a resistance set to serve as a critical damping condition in combination with the junction capacitance and the lead inductance of the photodiode.

BRIEF DESCRIPTION OF THE DRAWINGS

FIGS. 1 to 3 are views according to one embodiment of the present invention, in which
FIG. 1 is a circuit diagram showing an arrangement of an optical receiver,
FIG. 2 is a circuit diagram showing an equivalent circuit of the optical receiver of FIG. 1,
and
FIG. 3 is a graph showing an example of the transient response characteristic of the optical receiver according to this embodiment.

DETAILED DESCRIPTION OF THE PREFERRED EMBODIMENT

An embodiment of the present invention will be described below with reference to the accompanying drawings.

Figure 4:
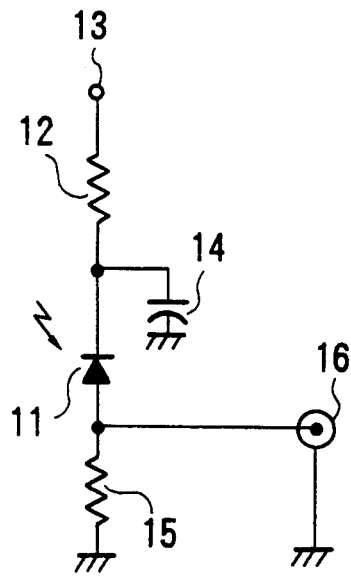
FIG. 4 is a circuit diagram showing an arrangement of a conventional optical receiver.
Figure 3:
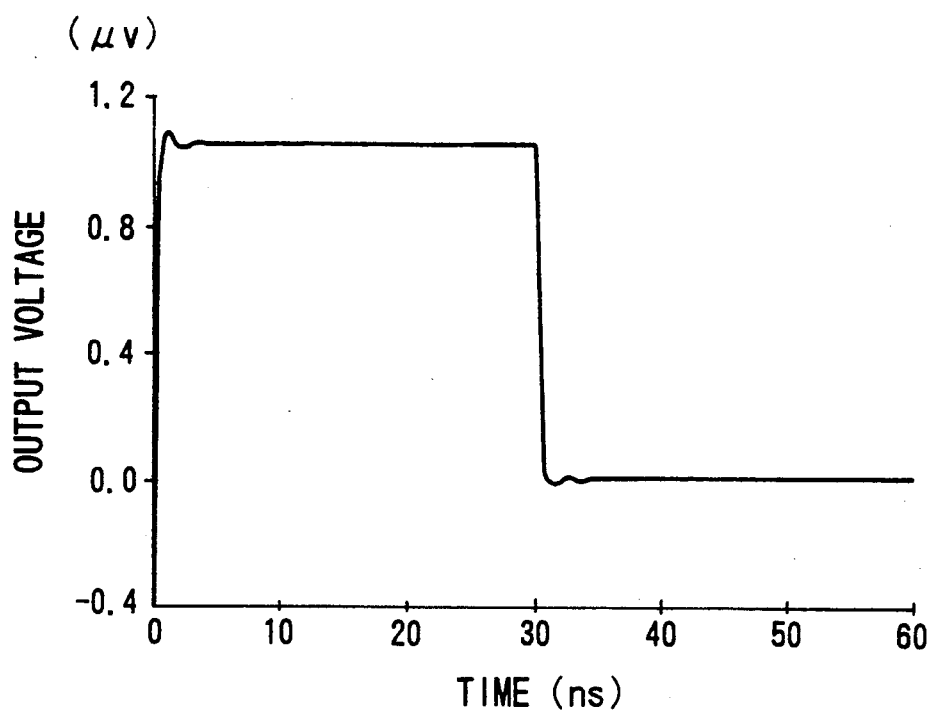

FIGS. 1 to 3 show an embodiment of the present invention, in which FIG. 1 shows an arrangement of an optical receiver, FIG. 2 shows an equivalent circuit of the optical receiver of FIG. 1, and FIG. 3 graphically illustrates an example of the transient response characteristic of the optical receiver of this embodiment.

As shown in FIG. 1, the optical receiver of this embodiment has a photodiode 11. The cathode electrode of this photodiode 11 is connected to a DC bias terminal 13 via a resistor 12 and bypassed to the ground via a bypass capacitor 14 for a high frequency signal. The resistor 12 and the DC bias terminal 13 constitute a bias circuit 30 for applying a DC bias voltage to the photodiode 11. The anode electrode of the photodiode 11 is grounded via a first resistor 21 as an output resistor and connected to an output terminal 16 via a second resistor 22 as a damping resistor. The resistors 21 and 22 and the output terminal 16 constitute an output circuit 40 for outputting a voltage corresponding to an optical current generated by the photodiode 11. The output terminal 16 is connected to, e.g., an oscilloscope for waveform observation via a coaxial cable.

FIG. 2 shows an equivalent circuit of the above optical receiver.

In this equivalent circuit, the photodiode 11 is replaced by a current source 18 for generating an optical current in accordance with an input optical signal, a capacitor 19 connected in parallel with the current source 18, and a coil 20 arranged between the current source 18 and the resistors 21 and 22. In this arrangement, the capacitor 19 is the junction capacitance of the photodiode 11, and the coil 20 is the inductance of wiring determined primarily by lead wires of the photodiode 11. A resistance $R_2$ of the resistor 22 is set to serve as a critical damping condition with respect to the capacitor 19, the coil 20, the resistor 21, and a load resistor connected to the output terminal 16.

A practical example of the resistance $R_2$ of the resistor 22 to serve as the critical damping condition will be described below.

Suppose that a resistance $R_0$ of the resistor 12 is 1 kΩ and a capacitance $C_1$ of the bypass capacitor 14 is 0.1 μF. Suppose also that a capacitance $C_2$ of the capacitor 19 is 2 pF, an inductance $L_1$ of the coil 20 is 10 nH (nano Henry: $10^{-9}$H), a current generated by the current source 18 is Ip, and a combined resistance of the resistors 21 and 22 and the above-mentioned load resistor is R. In this case, the critical damping condition is given by $R^2 = 4L_1/C_2$. By substituting $L_1 = 10$ nH and $C_2 = 2$ pF into this equation, $R = 141$ Ω is attained. Since the resistance of the load resistor is 50 Ω, $R_2 = 151$ Ω if $R_1 = 470$ Ω.

In the optical receiver having the above arrangement, an input optical signal is converted into a current Ip by the photodiode 11, and an output voltage appears at the output terminal 16.

Figure 5:
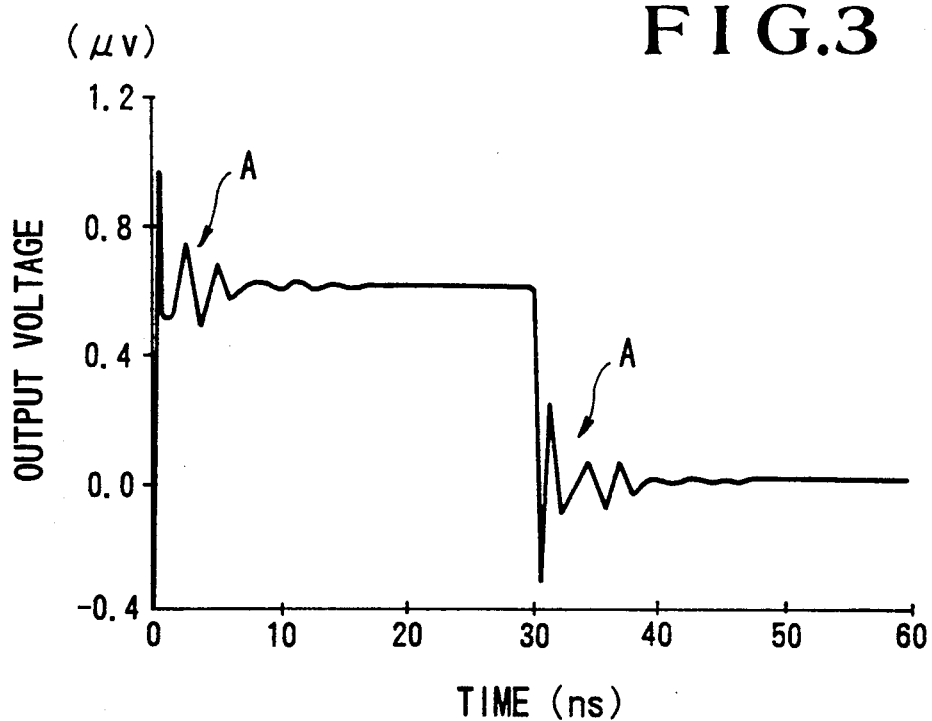
FIG. 5 is a graph showing an example of transient response characteristic of the conventional optical receiver.

FIG. 3 shows a signal voltage waveform obtained at the output terminal 16 when the optical receiver of this embodiment receives a rectangular-wave optical signal. As shown in FIG. 3, ringing is suppressed in the optical receiver of this embodiment. In addition, since an equivalent load resistance of the photodiode 11 is increased, an output voltage is increased by 20% or more compared with that of a conventional example shown in FIG. 5. Note that the equivalent load resistance of the photodiode 11 is the resistance of a single resistor, assuming that the single resistor is present to produce an output voltage from the current Ip generated by the photodiode 11.

As has been described above, according to the optical receiver of this embodiment, the resistor 22 is added such that the ringing caused by the junction capacitance of the photodiode 11 and the inductance of wiring is canceled. Therefore, since ringing is suppressed to prevent distortion in output waveform, it is possible to perform accurate waveform observation. This is effective particularly in situations where a high-speed optical signal is converted into an electrical signal. In addition, according to the optical receiver of this embodiment, the equivalent load resistance of the photodiode 11 can be increased to result in an increase in output voltage.

What is claimed is:

1. An optical receiver comprising:
   a light-receiving element for converting an optical signal into an electrical signal;
   a bias circuit for applying a DC bias voltage to said light-receiving element;
   an output circuit for outputting, from an output terminal, a voltage corresponding to an optical current generated by said light-receiving element; and
   a damping resistor connected between said light-receiving element and said output terminal in said output circuit and having a resistance set to serve as a critical damping condition in combination with a junction capacitance and a lead inductance of said light-receiving element.

2. A receiver according to claim 1, wherein said light-receiving element is a photodiode, said bias circuit is connected to a cathode electrode of said photodiode, said output circuit has an output resistor connected between an anode electrode of said photodiode and ground, and said output terminal is connected to the anode electrode of said photodiode via said damping resistor.

3. A receiver according to claim 2, wherein a resistance of said damping resistor is set to serve as a critical damping condition with respect to a junction capacitance of said photodiode, an inductance of wiring, said output resistor, and a load resistor connected to said output terminal.

4. A receiver according to claim 1, wherein said output terminal is connected to a device for waveform observation via a coaxial cable.

* * * * *